(12) United States Patent
Paulsen et al.

(10) Patent No.: US 10,441,106 B2
(45) Date of Patent: Oct. 15, 2019

(54) COOKING SYSTEM AND METHOD OF USE

(71) Applicants: Heath Paulsen, Ankeny, IA (US); Blair Paulsen, Council Bluffs, IA (US); Mark Paulsen, Atlantic, IA (US)

(72) Inventors: Heath Paulsen, Ankeny, IA (US); Blair Paulsen, Council Bluffs, IA (US); Mark Paulsen, Atlantic, IA (US)

(73) Assignee: Heath Paulsen, Ankeny, IA (US)

( * ) Notice: Subject to any disclaimer, the term of this patent is extended or adjusted under 35 U.S.C. 154(b) by 0 days.

(21) Appl. No.: 14/977,158

(22) Filed: Dec. 21, 2015

(65) Prior Publication Data

US 2016/0174761 A1 Jun. 23, 2016

Related U.S. Application Data

(60) Provisional application No. 62/096,142, filed on Dec. 23, 2014.

(51) Int. Cl.
*A47J 36/02* (2006.01)

(52) U.S. Cl.
CPC .................. *A47J 36/027* (2013.01)

(58) Field of Classification Search
CPC .................................... A47J 36/027
USPC ......... 99/400, 401, 425, 446, 444, 445, 447, 99/449
See application file for complete search history.

(56) References Cited

U.S. PATENT DOCUMENTS

| | | | | |
|---|---|---|---|---|
| 4,064,797 A | * | 12/1977 | Forlani | A47J 37/06 99/341 |
| D370,825 S | * | 6/1996 | Parduhn | D7/359 |
| D386,939 S | * | 12/1997 | Kelly | D7/359 |
| 5,935,478 A | * | 8/1999 | Parduhn | A47J 36/027 219/733 |
| 6,608,292 B1 | * | 8/2003 | Barnes | A47J 36/027 219/730 |
| 7,067,778 B2 | * | 6/2006 | Kim | H05B 6/6494 219/682 |
| 2001/0035408 A1 | * | 11/2001 | Adams | A47J 36/027 219/734 |
| 2009/0107993 A1 | * | 4/2009 | Ohyama | A47J 27/10 219/731 |
| 2010/0163553 A1 | * | 7/2010 | Backaert | A47J 27/04 219/682 |
| 2012/0118173 A1 | * | 5/2012 | Zhan | A47J 37/0611 99/425 |
| 2014/0261377 A1 | * | 9/2014 | Chung | A47J 45/07 126/25 R |

(Continued)

*Primary Examiner* — Ibrahime A Abraham
*Assistant Examiner* — Biniam B Asmelash
(74) *Attorney, Agent, or Firm* — Zarley Law Firm, PLC

(57) ABSTRACT

An improved bacon cooking system and method of use is presented which includes a container that houses a rack having a pair of sidewalls with a curved member that extends between the sidewalls. The curved member includes a plurality of vanes and a plurality of perforations. A plurality of inserts are sized and shaped to be placed over the curved member in overlapping stacked relation to one another. Bacon slices are placed over the curved member and in-between the inserts. When the system is placed in an oven or a microwave oven, the bacon is generally held in place by the curved member and the inserts thereby producing crispy, generally flat and straight bacon without the mess or inconvenience of cooking bacon conventionally in a pan.

14 Claims, 6 Drawing Sheets

(56) References Cited

U.S. PATENT DOCUMENTS

| | | | |
|---|---|---|---|
| 2014/0261378 A1* | 9/2014 | Barreto | A47J 37/0713 126/25 R |
| 2016/0029842 A1* | 2/2016 | Taylor | A47J 37/0786 220/571 |

* cited by examiner

COOKING SYSTEM AND METHOD OF USE

CROSS-REFERENCE TO RELATED APPLICATIONS

This application claims priority to Provisional Application U.S. Ser. No. 62/096,142 filed on Dec. 23, 2014, which is herein incorporated by reference in its entirety.

FIELD OF THE INVENTION

This invention relates to a cooking device. More specifically, and without limitation, this invention relates to a cooking system and method that provides advantages when cooking bacon.

BACKGROUND OF THE INVENTION

There are countless methods and styles of cooking food. From steaming, to microwaving, baking to frying, sautéing to grilling. Each method produces unique results has its own advantages and disadvantages. There are countless forms of devices used to facilitate cooking in these many disparate fashions. From pots and pans to fryers and ovens. Each device produces unique results has its own advantages, as well as disadvantages.

In recent years the popularity and interest in cooking bacon has dramatically increased. Historically bacon has been cooked in sliced form in a pan placed over a heat source such as a stove. While this conventional method is certainly effective, it has its disadvantages. Namely, cooking slab bacon in a pan on a stove is incredibly messy as bacon fat tends to splatter all over the area surrounding the stove. This causes a tremendous amount of post-cooking clean-up work. Another problem with cooking bacon in this manner is that the resulting cooked bacon is often curled, wrinkled or irregularly shaped, as opposed to being flat and straight. This irregularity shaped cooked bacon is harder to eat or use in certain applications, such as on a sandwich.

An alternative manner of cooking sliced bacon is to bake it in a pan in the oven. Again, this method is effective at cooking sliced bacon, however this method also has its disadvantages. Namely, baking sliced bacon in an oven is messy as well. Like cooking bacon in a pan on the stove when bacon is baked it tends to splatter all over the oven. This causes a tremendous amount of post-baking clean-up work. To resolve this problem, the pan can be covered. However, when the pan is covered this makes it more-difficult to achieve crispy results, which is often desired by many bacon consumers. As such, the results of baking bacon are often sub-par. In addition, baked bacon, like pan-cooked bacon, is often curled, wrinkled or irregularly shaped, as opposed to being flat and straight.

With the advent of microwave ovens, various systems were developed for microwaving bacon in new ways. One such system is known as the BaconWave™. The Bacon-Wave™ is a device having a tray shaped bottom having a plurality of indexed tabs that extend upward from the tray in spaced alignment with one another. Bacon slices are then placed in these spaces, held with a skewer and the device is placed in the microwave and cooked. As the device is microwaved, the spaced indexed tabs hold the bacon in spaced relation in a generally straight manner and as the bacon is cooked the fat drips off the bacon into the tray. While the BaconWave™ certainly provided a new way of cooking bacon using a microwave, the BaconWave™ has its disadvantages. Namely, when cooking bacon in the microwave using the BaconWave™ the bacon tends to splatter all over the microwave creating a substantial amount of post-cooking clean-up work which obviates any implied convenience the BaconWave™ provides. This is partly because the BaconWave™ is uncovered when it is placed in the microwave. However the BaconWave™ must remain uncovered otherwise the bacon will not be crispy when done cooking. Another disadvantage of the BaconWave™ is that while it does create crispy and generally flat cooked bacon, the cooked bacon tends to be dry and loses much of its flavor and therefore regardless of any convenience the Bacon-Wave™ provides, the result is unacceptable to many bacon consumers.

Another cooking apparatus for microwaving bacon is known as the WowBacon® which is formed of a hollow container having a plurality of suspension vanes removably placed inside the container which are covered by a removable top. Slices of bacon are draped over the vanes and the top is placed on the container and the device is microwaved. Unlike the BaconWave™, the WowBacon® provides the benefit of being enclosed during cooking and therefore the WowBacon® prevents or at least reduces bacon splatter inside the microwave. While the WowBacon® provides that benefit, the WowBacon® has its own disadvantages. Namely, the bacon in the WowBacon® must be slung over the vanes causing each cooked piece of bacon to have a V-shape to it. In addition, the bacon cooked in the WowBacon® is curled, wrinkled or irregularly-shaped, as opposed to being flat and straight, thereby causing the cooked bacon to be harder to eat or use in certain applications, such as on a sandwich.

There are other systems for cooking bacon, however these systems each suffer from their own disadvantages. Therefore, for the reasons stated above, and for other reasons stated below which will become apparent to those skilled in the art upon reading and understanding the specification, there is a need in the art for an improved bacon cooking system and method of use.

Thus, it is a primary object of the invention to provide an improved bacon cooking system and method of use that improves upon the state of the art.

Another object of the invention is to provide an improved bacon cooking system and method of use that produces great tasting bacon.

Yet another object of the invention is to provide an improved bacon cooking system and method of use that produces generally flat and straight bacon.

Another object of the invention is to provide an improved bacon cooking system and method of use that produces crispy bacon.

Yet another object of the invention is to provide an improved bacon cooking system and method of use that is easy to clean.

Another object of the invention is to provide an improved bacon cooking system and method of use that does not produce a mess when used.

Yet another object of the invention is to provide an improved bacon cooking system and method of use that can be used in a conventional oven and a microwave oven.

Another object of the invention is to provide an improved bacon cooking system and method of use that can be used for a great number of purposes.

Yet another object of the invention is to provide an improved bacon cooking system and method of use that prevents splatter when cooking.

Another object of the invention is to provide an improved bacon cooking system and method of use that can be used for cooking bacon, browning hamburger and steaming vegetables.

Yet another object of the invention is to provide an improved bacon cooking system and method of use that has a simplistic and intuitive design.

Another object of the invention is to provide an improved bacon cooking system and method of use that is inexpensive to manufacture.

Yet another object of the invention is to provide an improved bacon cooking system and method of use that is easy and intuitive to use.

Another object of the invention is to provide an improved bacon cooking system and method of use that has a minimum number of parts Yet another object of the invention is to provide an improved bacon cooking system and method of use that easy to assemble and disassemble.

Another object of the invention is to provide an improved bacon cooking system and method of use that is dishwasher safe.

Yet another object of the invention is to provide an improved bacon cooking system and method of use that has a small footprint that fits in most ovens.

Another object of the invention is to provide an improved bacon cooking system and method of use that is safe to use.

Yet another object of the invention is to provide an improved bacon cooking system and method of use that has a long useful life.

Another object of the invention is to provide an improved bacon cooking system and method of use that is durable.

Yet another object of the invention is to provide an improved bacon cooking system and method of use that can be used in countless applications.

Another object of the invention is to provide an improved bacon cooking system and method of use that can be used with any form of bacon, from thick cut to thin cut.

These and other objects, features, or advantages of the invention will become apparent from the specification and claims.

SUMMARY OF THE INVENTION

An improved bacon cooking system and method of use is presented which includes a container that houses a rack having a pair of sidewalls with a curved member that extends between the sidewalls. The curved member includes a plurality of vanes and a plurality of perforations. A plurality of inserts are sized and shaped to be placed over the curved member in overlapping stacked relation to one another. Bacon slices are placed over the curved member and in-between the inserts. When the system is placed in an oven or a microwave oven, the bacon is generally held in place by the curved member and the inserts thereby producing crispy, generally flat and straight bacon without the mess or inconvenience of cooking bacon conventionally in a pan.

DETAILED DESCRIPTION OF THE PREFERRED EMBODIMENTS

Figure 1:
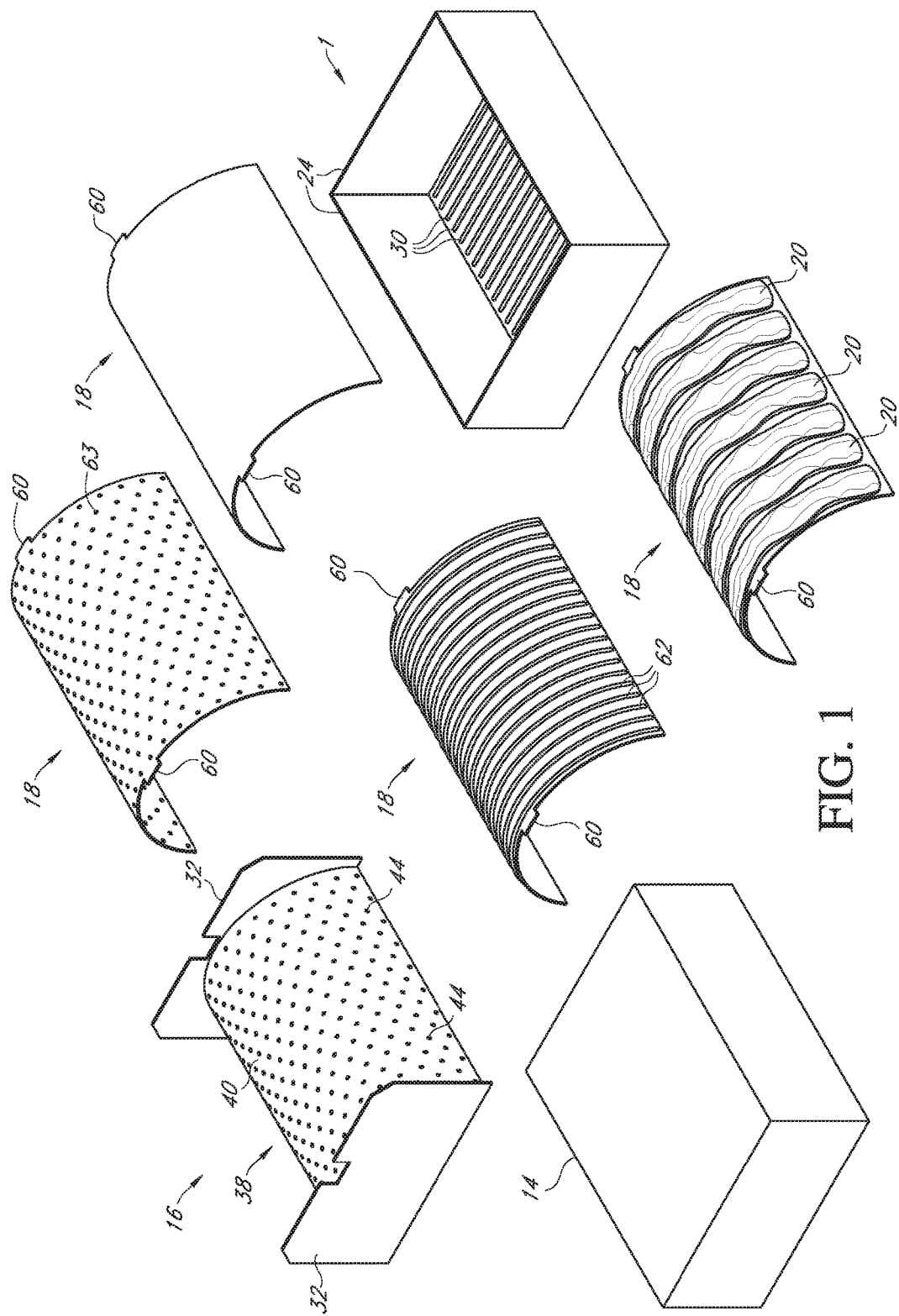
FIG. 1 is a perspective view of a cooking system.
Figure 2:
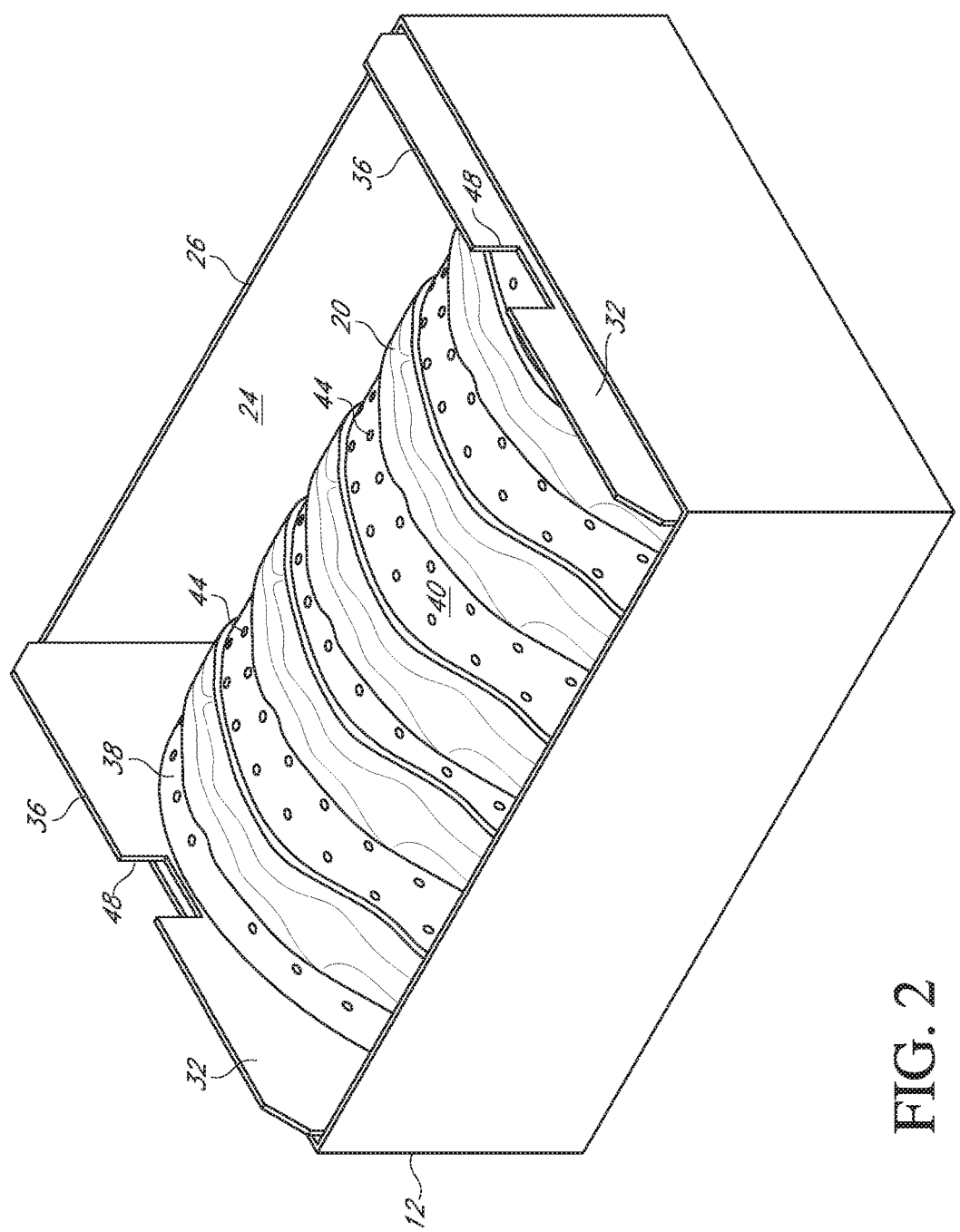
FIG. 2 is a perspective view of a cooking system.
Figure 3:
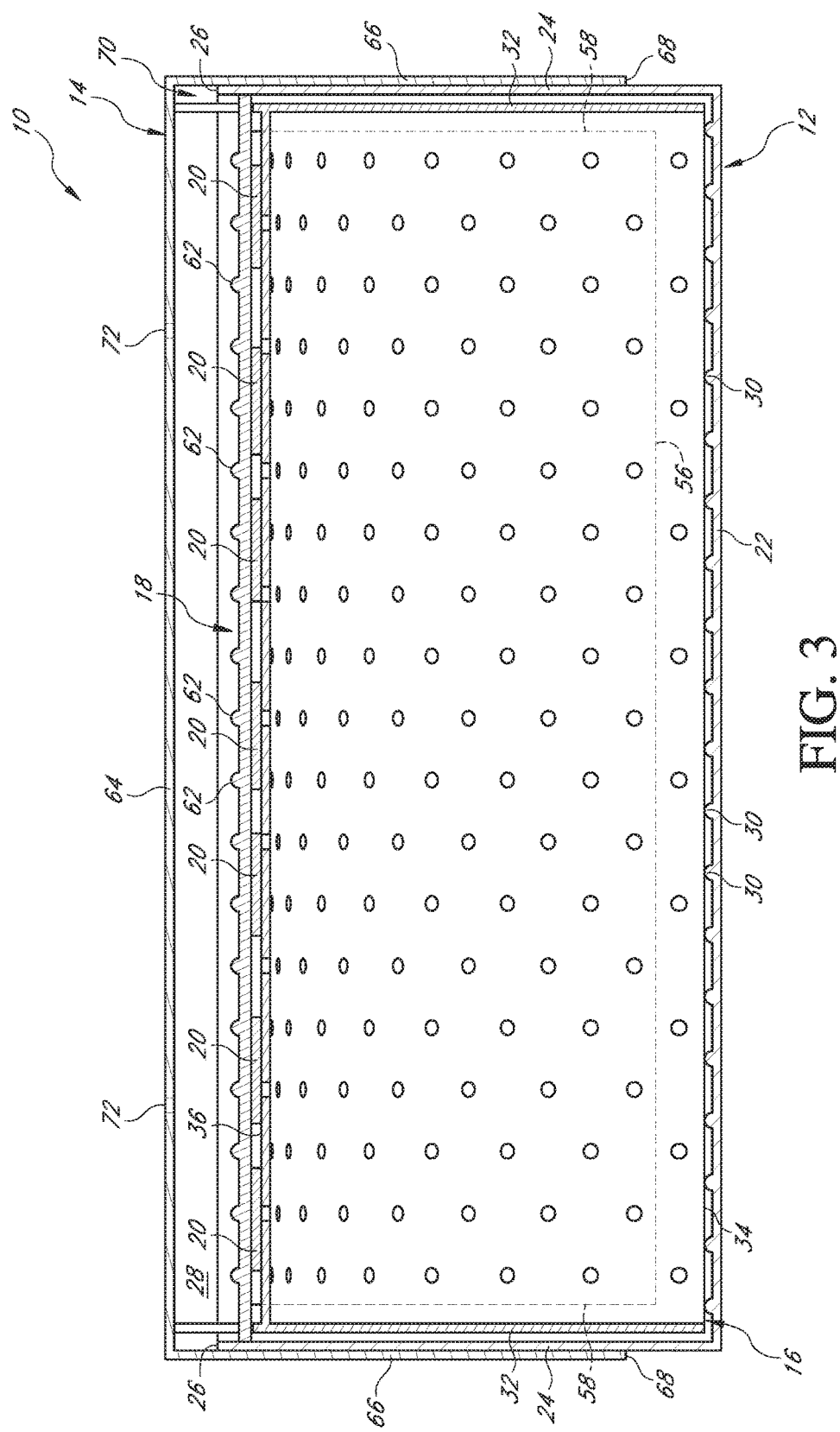
FIG. 3 is a side sectional view of a cooking system.
Figure 4:
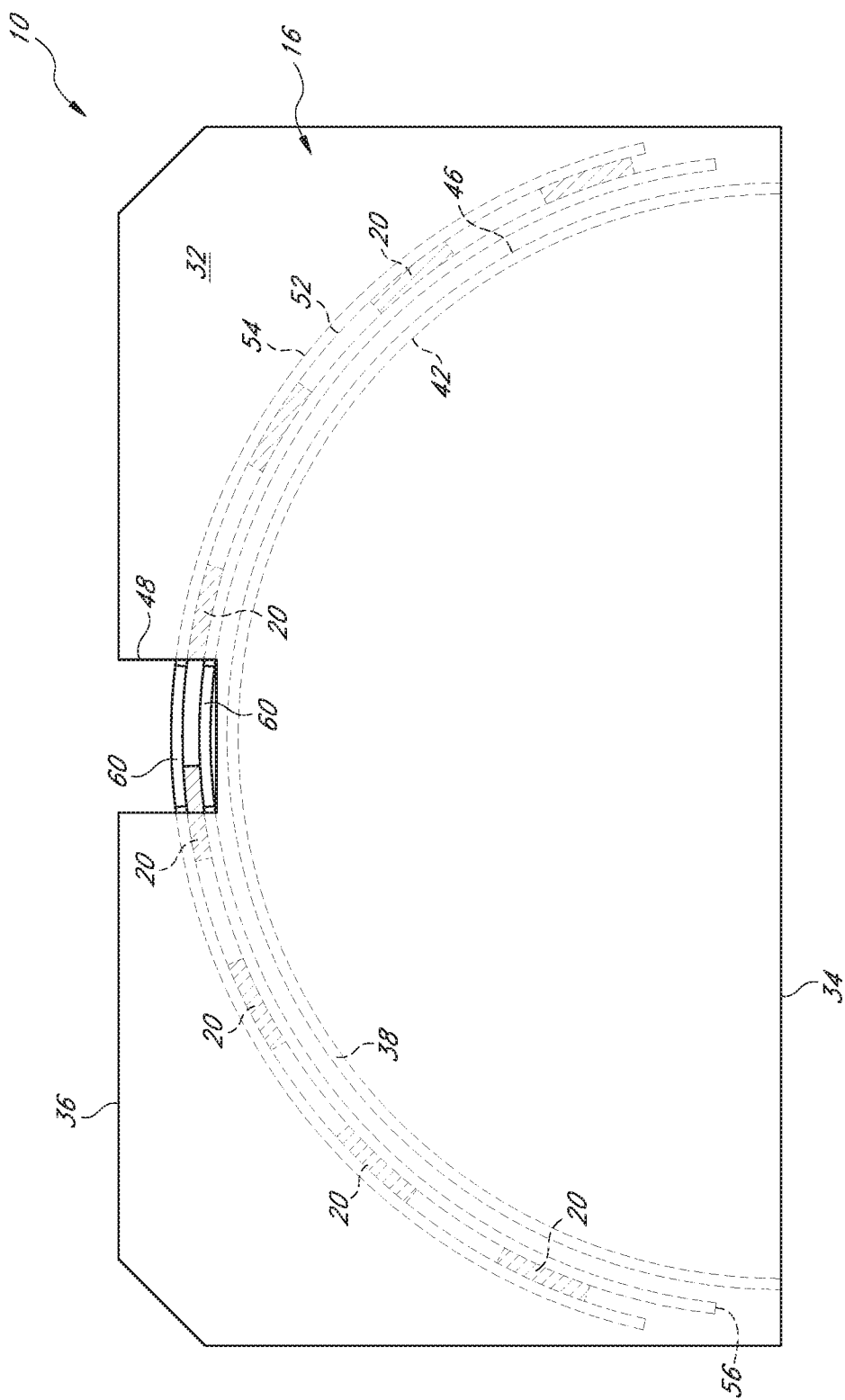
FIG. 4 is an end sectional view of a cooking system.
Figure 5:
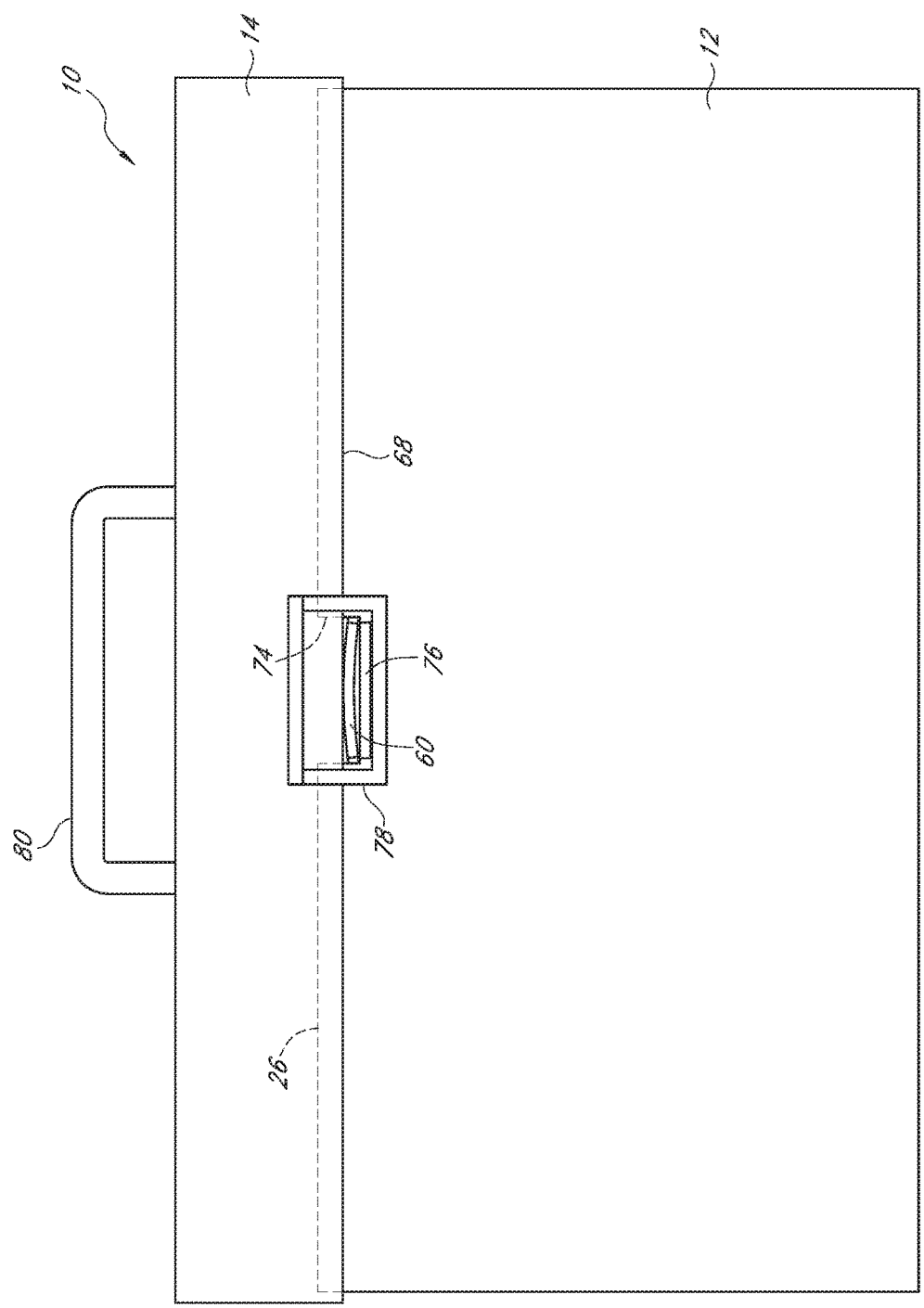
FIG. 5 is a side view of a cooking system.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

While the figures show the invention used in association with cooking sliced bacon, the invention is not so limited. The systems and methods presented herein can be used with countless forms of meat, vegetables, food products, or for that matter, with anything that fits within the container and requires heating. Bacon is merely used as one of countless examples—but it is only that, an example. Therefore, the description is not to be limited to bacon.

With reference to the figures, a cooking system 10 is presented. Cooking system 10 is formed of any suitable size, shape and design. In one arrangement, as is shown, cooking system is formed of a container or bottom 12, a cover 14, a rack 16, and a plurality of inserts 18, among other parts, pieces and components. In the arrangement shown, a plurality of bacon slices 20 are laid over the inserts 18 for cooking. Again, herein, while bacon is used as an example, the invention is not so limited and any other sliced food-product or other food product can be used.

Container:

Container 12 is formed of any suitable size, shape and design. In the arrangement shown, as one example, container 12 includes a bottom 22. Bottom 22 is generally planar in shape and defines the bottom surface of container 12. In the arrangement shown, bottom 22 is generally square or rectangular in shape, however any other size, shape or design is hereby contemplated. Sidewalls 24 connect to the outer edges of bottom 22 and extend upwardly therefrom before terminating in an upper edge 26. In the arrangement wherein bottom 22 is square or rectangular, there are four sidewalls 24 that extend upward from bottom 22 in approximate perpendicular alignment to the plane of bottom 22, in approximate perpendicular alignment to their adjoining sidewalls 24 on either side. In this way, the combination of bottom 22 and sidewalls 24 form a hollow interior 28 of container 12. As such, the planes of opposing sidewalls 24 extend in approximate parallel spaced relation to one another The upper surface of bottom 22 includes a plurality of vanes 30 that extend upward a distance from the plane bottom 22 into hollow interior 28. In the arrangement show vanes 30 extend in parallel spaced relation to one another across the entirety of or a portion of bottom 22. In the arrangement wherein the vanes 30 extend across the entire bottom 22, the outward ends of vanes 30 connect to the interior surfaces of opposing sidewalls 24. In this way, the vanes 30 provide additional structural rigidity to opposing sidewalls 24. The spaces or groves between vanes 30 provide troughs that receives and holds liquid fat when the bacon 20 is cooked within container 12. Upper edge 26 of sidewalls 24 extend in general alignment to one another thereby providing a generally flat and flush upper surface.

Rack:

Rack 16 is formed of any suitable size, shape and design. In the arrangement shown, as one example, rack 16 is sized and shaped to fit within container 12 within close tolerances. Rack 16 has a pair of sidewalls 32. In the arrangement shown, sidewalls 32 are generally flat and square or rectangular and extend upward from a bottom edge 34 to a top edge 36 in generally perpendicular spaced relation to one another. In the arrangement shown, the upper corners are rounded or chamfered. Bottom edge 34 is generally flat and is intended to sit flat and flushly on the upper surface of bottom 22 or on the plane formed by the upper surface of the plurality of vanes 30 of container 12.

A curved member 38 extends between and connects opposing sidewalls 32 to one another. Curved member 38 is generally curved when viewed from the side and includes a convex surface 40 and a concave surface 42. When rack 16 is in an upright alignment, the upward facing surface is convex in shape whereas the downward facing surface is concave in shape. In contrast, when rack 16 is in an inverted position, the upward facing surface is concave whereas the downward facing surface is convex in shape. The apex or tangent point of the curve of curved member 38 is positioned approximately in the middle of sidewalls 32 and is positioned a distance below the top edge 36 of sidewalls 32.

Curved member 38 includes a plurality of openings or perforations 44 therein that allow liquids and air to flow through curved member 38, such as bacon fat when cooking bacon or steam when steaming. Perforations 44 are positioned in any portion of curved member 38 and in one arrangement are evenly spaced across the entirety of curved member 38. Alternatively, as in the arrangement shown, perforations 44 are positioned from sidewall to sidewall 32 and are centrally positioned around the apex of curved member 38 and extend a distance therefrom towards bottom edge 34 but terminate prior to reaching bottom edge 34. When used in an upright manner, perforations 44 allow fluids to flow through curved member 38 allowing for more-even cooking. When used in an inverted manner, perforations 44 allow steam to transfer through curved member when steaming vegetables for example, or allow fluids to drain out of rack 16 when browning hamburger meat for example.

In one arrangement, the convex surface 40, or alternatively the concave surface 42, of curved member 38 also includes a plurality of vanes 46 that extend across the entire surface or a portion of the surface of curved member 38 in generally parallel spaced relation to one another. In this way, vanes 46 extend in approximate parallel relation with the plane of sidewalls 32 of rack 12 and along the angle of curvature. Vanes 46 extend above the surface of curved member 38 a distance thereby forming a channel there between. These vanes 46 allow a food product to be elevated above the surface of curved member 38 a distance and allow fluids to drain along the curved surface 38 of rack 12.

In one arrangement, as is shown, the top edge 36 of sidewalls 24 extend in general alignment to one another thereby providing a generally flat and flush upper surface, other than the rounded or chamfered outer corners. In the arrangement shown, the pair of opposing sidewalls 32 include alignment features 48 therein. Alignment features 48 are any features that are used for aligning one object or device relative to one another and can include one or more or a combination of protrusions or recesses or grooves or rails or any other feature. In the arrangement shown, as one example, alignment features 48 are a pair of generally square or rectangular recesses that are generally centrally positioned, and aligned with the apex of curved member 38. These alignment features 32 are used for aligning inserts 18 as further described herein.

Inserts:

System 10 includes a plurality of inserts 18. Inserts 18 are formed of any suitable size, shape and design. In the arrangement shown, as one example, inserts 18 are is sized and shaped to generally mimic the size and shape of curved member 38 and fit within and between sidewalls 32 of rack 16 in vertically stacked relation to one another within close tolerances to one another.

More specifically, inserts 18 are generally curved when viewed from the side mimic the curvature of curved member 38. Inserts have a convex surface 52 and a concave surface 54. When rack 16 is in an upright alignment, and inserts 18 are stacked on the curved member 38, the upward facing surface is convex in shape whereas the downward facing surface is concave in shape.

The curved surface of inserts 18 terminate in a generally flat bottom edge 56 which extend in generally perpendicular alignment with the side edges 58. Side edges 58 are generally flat when viewed from above or below and include an alignment feature 60 therein. Alignment features 60 are any features that are used for aligning one object or device relative to one another and can include one or more or a combination of protrusions or recesses or grooves or rails or any other feature. In the arrangement shown, alignment features 60 of inserts 18 matingly align with and engage the alignment features 48 of rack 16. More specifically, as one example as is shown, the alignment features 60 in inserts 18 are tabs that extend outward from side edges 58. These tabs are sized and shaped to fit within recesses in the sidewalls 32 of rack 16 within close and tight mating relationship. In this way, when the tabs of inserts 18 are within the recesses of rack 16, the inserts 18 are perfectly vertically stacked with one another and are prevented from sliding down the curved member 38.

In one arrangement, the convex surface 52, or alternatively the concave surface 54, of insert 18 also includes a plurality of vanes 62 that extend across the entire curved surface or a portion of the surface of insert 18 in generally parallel spaced relation to one another. In this way, vanes 62 extend in approximate parallel relation with the plane formed from side edges 58 and along the angle of curvature. Vanes 62 extend above the curved surface of inserts 18 a distance thereby forming a channel there between. These vanes 62, when placed on the convex surface 52 allow a food product to be elevated above the curved surface of insert 18 when the food product is placed on top of an insert a distance and allow fluids to drain along the curved surface insert 18. Alternatively, these vanes 62, when placed on the concave surface 54 allow a food product to be positioned a distance below the curved surface of an insert 18 placed on top of the food product therefore allow fluids to drain along the curved surface insert 18 as well as provides an air gap between the food product and the next insert 18.

In one arrangement, inserts 18 include a plurality of perforations 63 therein. Perforations 63 allow fluids and gases to pass through the inserts 18 when in stacked relation to one another thereby allowing for proper and even cooking.

Cover:

Cooking system 10 includes a Cover 14. Cover 14 is formed of any suitable size, shape and design. In the arrangement shown, as one example, cover 14 is sized and shaped to fit over and engage container 12. In the arrangement shown, as one example, cover 14 includes a top wall 64. Top wall 64 is generally planar in shape and defines the upper surface of cover 14. In the arrangement shown, top wall 64 is generally square or rectangular in shape and mimics the size, shape and footprint of bottom 22 of container 12, however any other size, shape or design is hereby contemplated. Sidewalls 66 connect to the outer edges of top wall 64 and extend downward therefrom before terminating in lower edge 68. In the arrangement wherein top wall 64 is square or rectangular, there are four sidewalls 66 that extend downward from top wall 64 in approximate perpendicular alignment to the plane of top wall 64, in approximate perpendicular alignment to their adjoining sidewalls 66 on either side. In this way, the combination of top wall 64 and sidewalls 66 form a hollow interior 70 of cover 14. As such, the planes of opposing sidewalls 66 extend in approximate parallel spaced relation to one another. In one arrangement, cover 14 fits over container 12 in mating relation. When cover 14 is fully installed over container 12, the upper edge 26 of container 12 engages the bottom surface of top wall 64 in flat and flush abutment. In this position, at least a portion of the interior surface of sidewalls 66 of cover 14 are in flat and flush overlapping engagement with the exterior surface of the sidewalls 24 of container 12.

In one arrangement, the top wall 64 and or the sidewalls 66 include one or more perforations 72 therein to allow steam to escape out of the hollow interior 28, 70 defined by container 12 and cover 14. While these perforations 72 allow steam to escape the hollow interior 28, 70, the perforations 72 are sized and shaped to prevent the escape of splatter.

In Operation—Cooking Bacon:

When a user desires to cook bacon 20 using the system 10, the user places a plurality of bacon slices 20 over the convex surface 40 of the rack 16 in spaced alignment with one another. When vanes 30 are present, these bacon slices 20 are suspended a distance above the convex surface 40.

Once the convex surface 40 of the rack 16 is filled with bacon 20, an insert 18 is placed on top of the rack 16. In doing so, the user aligns the alignment features 60 of the insert 18 with the alignment features 48 of the sidewalls 32 of rack 16. Once these alignment features 48, 60 engage one another, the insert 18 is lowered until the concave surface 54 or the bottom edge of vanes 62 engage the bacon slices 20 placed on the rack 16. Next, the user drapes a plurality of pieces of bacon 20 over the convex surface 52 of the insert 18.

The user repeats this process until they use all the bacon 20 or all of their inserts 18. Once all the bacon 20 is used or all the inserts 18 are used, the user places the rack 16 into the container 12 until the rack 16 flushly sits flush upon the upper surface of the vanes 30 of bottom 22. Next, the user places cover 14 over the container 12 until the upper edge 26 of sidewalls 24 engage the bottom surface of the top wall 64 of cover.

With the system 10 now fully assembled, the system is placed in the microwave oven, or in a conventional oven. As the system 10 is heated the bacon 20 is cooked. The bacon grease runs down between the vanes 46 in curved member 38 and the vanes 62 in inserts 18. In addition, the bacon grease, as well as gasses tend to flow through the perforations 44, 63 in curved member 38 and inserts 18 thereby helping to properly and evenly cook the bacon 20.

As the bacon 20 cooks, the bacon grease is held in the grooves between the vanes 30 in the upper surface of bottom 22. In this way, the bacon grease is allowed to puddle below the rack 16 and not interfere or change the way in which the bacon 20 is cooked, thereby allowing the bacon 20 to be evenly cooked. Because the bacon 20 is held between the curved member 38 and the curved inserts 18 as the bacon 20 cooks, the bacon 20 is not allowed to curl or contort as it cooks. As such, the resulting cooked bacon 20 is generally flat and straight, albeit slightly curved, however this curvature can be easily taken out by bending the bacon 20 flat.

Figure 6:
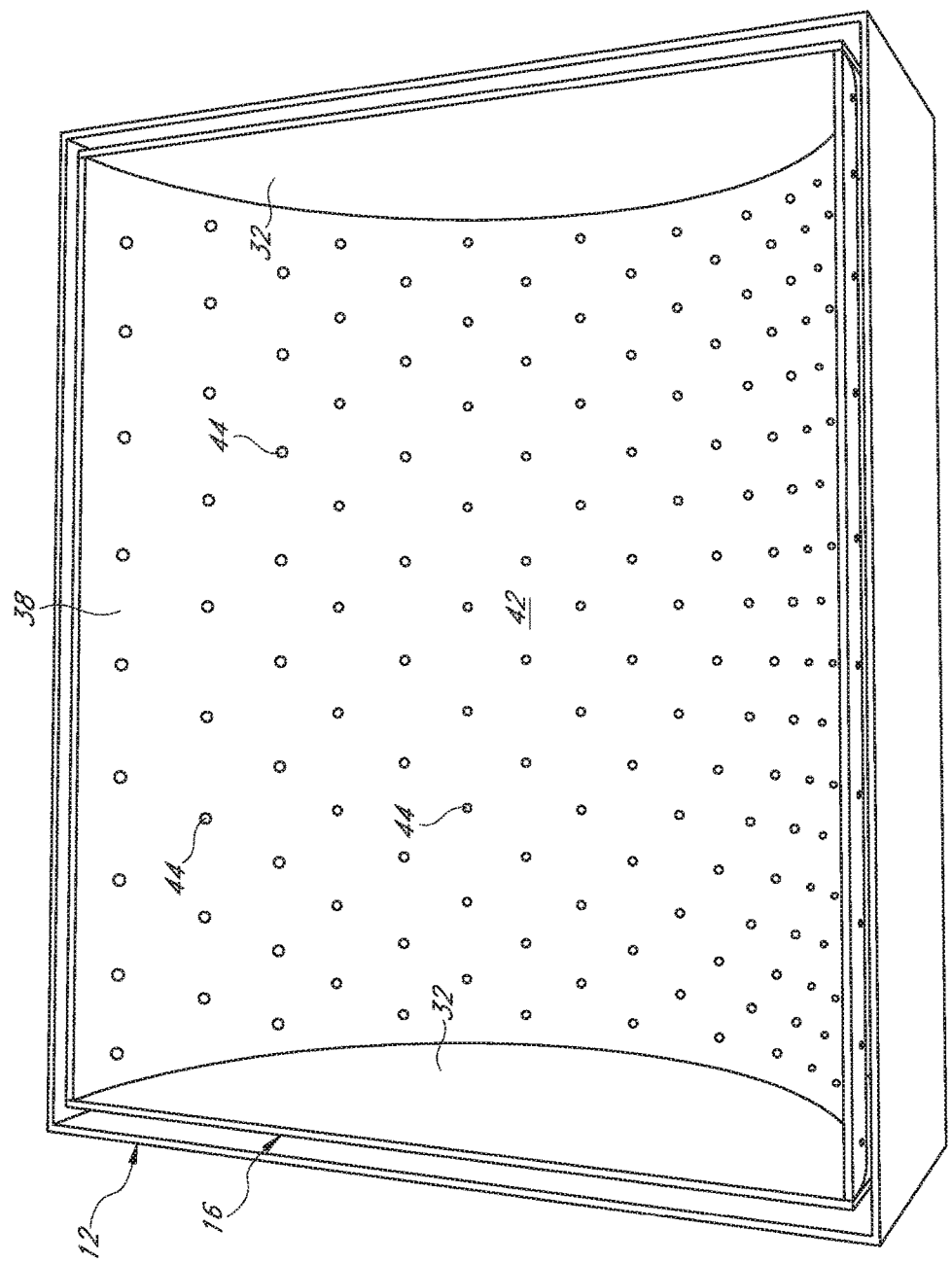
FIG. 6 is a perspective view of a cooking system.

In Operation—Browning Hamburger:

When a user desires to brown hamburger, or heat another food product using the system 10, the user inverts the rack 16 as shown in FIG. 6, such that the concave surface 42 of the curved member 38 faces upward. Next, the user places the raw hamburger or other food product in the recess formed by the concave surface 42. Next, the user places the rack 16 into the container 12 until the rack 16 flushly sits upon the upper surface of the vanes 30 of bottom 22. Next, the user places cover 14 over the container 12 until the upper edge 26 of sidewalls 24 engage the bottom surface of the top wall 64 of cover.

With the system 10 now fully assembled, the system is placed in the microwave oven, or in a conventional oven. As the system 10 is heated the hamburger is cooked. The grease runs through the perforations 44 in curved member 38. As the hamburger cooks, the grease is held in the grooves between the vanes 30 in the upper surface of bottom 22. In this way, the grease is allowed to puddle below the rack 16 and not interfere or change the way in which the browning of the hamburger, thereby allowing the hamburger to be evenly browned.

In Operation—Steaming Vegetables:

When a user desires to steam vegetables, or heat another food product using the system 10, the user inverts the rack 16 as shown in FIG. 6, such that the concave surface 42 of the curved member 38 faces upward. Next, the user places the vegetables or other food product in the recess formed by the concave surface 42 and the user pours an amount of water into the container 12 which is held between the vanes 30 in bottom 22. Next, the user places the rack 16 into the container 12 until the rack 16 flushly sits upon the upper surface of the vanes 30 of bottom 22. Next, the user places cover 14 over the container 12 until the upper edge 26 of sidewalls 24 engage the bottom surface of the top wall 64 of cover.

With the system 10 now fully assembled, the system is placed in the microwave oven, or in a conventional oven. As the system 10 is heated the water boils and steam transfers through he perforations 44 in curved member 38 and through the vegetables thereby steaming them.

When the user is done with the system 10 the parts of the system 10 are disassembled and are easily washed by hand or placed in a dishwasher. Not only does the system prevent splatter but itself is easy to clean.

From the above discussion and the accompanying drawings and claims it will be appreciated that the improved bacon cooking system and method of use improves upon the state of the art; produces great tasting bacon; produces generally flat and straight bacon; produces crispy bacon; is easy to clean; does not produce a mess when used; can be used in a conventional oven and a microwave oven; can be used for a great number of purposes; prevents splatter when cooking; can be used for cooking bacon, browning hamburger and steaming vegetables; has a simplistic and intuitive design; is inexpensive to manufacture; is easy and intuitive to use; has a minimum number of parts; is easy to assemble and disassemble; can be used with any form of bacon, from thick cut to thin cut; is dishwasher safe; has a small footprint that fits in most ovens; is safe to use; has a long useful life; is durable; can be used in countless applications, among countless other improvements and advantages.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

In an alternative embodiment, the bottom container 12 has a pair of notches 74 cut into opposite sidewalls 24 that extend from the upper edge 26 partially down the sidewall 24. The notches are aligned and are formed to receive the alignment features 60 of the inserts. A shelf 76 extends outwardly from the sidewalls 24 below the bottom of each notch.

The cover 14 fits over the container and the lower edge 68 engages the alignment features 60. The cover 14 is either weighted to provide downward force upon the alignment features or has a fastening member 78 that is attached to the cover 14 and engages the shelf 76 of the container such that the cover 14 is locked to the container 12 and force is applied to squeeze the alignment feature 60 between the shelf 76 and the lower edge 68 of the cover. Also, the cover has at least one knob or handle 80.

What is claimed is:

1. A cooking assembly, comprising:
a container having a bottom wall and sidewalls that form a hollow chamber;
a rack having a pair of opposing sidewalls and a curved member that extends between and connects to the opposing rack sidewalls;
the sidewalls of the rack having a top edge and a bottom edge wherein the bottom edge engages the bottom wall of the container;
the curved member having a convex surface and a concave surface, that covers the bottom wall of the container, in an upright position the convex surface is upwards facing an apex of the curved member is positioned in the middle of the sidewalls of the rack and below an entire length of the top edge of the sidewalls of the rack when in an upright position;
at least one insert placed on top of the rack and engages the food product between the rack and the insert; and
a cover that fits over the container;
wherein the sidewalls of the rack have a pair of alignment features having rectangular recesses that are centrally positioned on the sidewall of the rack;
wherein the inserts have tabs that extend outwardly and are received within the alignment features of the rack; and
wherein opposite sidewalls of the container have a notch that receives tabs that extend outwardly from the inserts.

2. A cooking assembly, comprising:
a container having a bottom wall and sidewalls that form a hollow interior;
a rack having a pair of sidewalls having a top edge and a bottom edge that engages the bottom wall of the container and a curved member that extends between and is connected to opposing rack sidewalls;
wherein the curved member extends convexly above and across the bottom wall such that a cavity is formed between the curved member and the bottom surface; the curved member having an apex positioned at a middle of the pair of opposing sidewalls and below an entire length of the a top edge of the pair of opposing sidewalls;
an insert having a size and shape that mimics the curved member of the rack; and a cover that fits over the sidewalls of the container;
wherein the sidewalls of the rack have a pair of alignment features having rectangular recesses that are centrally positioned on the sidewall of the rack;
wherein the inserts have tabs that extend outwardly and are received within the alignment features of the rack; and
wherein opposite sidewalls of the container have a notch that receives tabs that extend outwardly from the inserts.

3. The assembly of claim 2 further comprising a plurality of vanes that extend across the bottom wall of the container.

4. The assembly of claim 2 further comprising a shelf that extends outwardly from the sidewalls of the container below the notches.

5. The assembly of claim 2 wherein the curved member of the rack has a concave surface and a convex surface.

6. The assembly of claim 2 wherein the curved member of the rack has a plurality of perforations.

7. The assembly of claim 2 wherein the curved member of the rack has a plurality of vanes that extend across at least a portion of the surface of the curved member.

8. The assembly of claim 2 wherein the insert has an alignment feature that matingly aligns with and engages the alignment feature of the rack.

9. The assembly of claim 2 wherein the insert has a convex surface and a concave surface.

10. The assembly of claim 2 wherein the insert has a plurality of vanes that extend across at least a portion of a surface of the insert.

11. The assembly of claim 2 wherein the insert has a plurality of perforations.

12. A cooking assembly, comprising:
a container having a bottom wall and a pair of opposing sidewalls that form a hollow interior; a rack having a member that is curved along a length extending between opposing sidewalls having a top edge and a bottom edge that engages the bottom wall of the container;
wherein the curved member extends convexly above and across a plane formed by the bottom surface, such that the curved member substantially covers the bottom wall; the curved member having an apex positioned at approximately a middle of the pair of opposing sidewalls below an entire length of the top edge of the opposing sidewalls; and
a cover that fits over the container;

wherein the sidewalls of the rack have a pair of alignment features having rectangular recesses that are centrally positioned on the sidewall of the rack; wherein the inserts have tabs that extend outwardly and are received within the alignment features of the rack; and wherein opposite sidewalls of the container have a notch that receives tabs that extend outwardly from the inserts.

13. The assembly of claim 1 wherein when assembled, the rack is positioned within the container in close tolerances.

14. The assembly of claim 6, wherein the curved member of the rack has a plurality of perforations.

\* \* \* \* \*